(12) United States Patent
Thubert et al.

(10) Patent No.: US 10,959,199 B2
(45) Date of Patent: Mar. 23, 2021

(54) FAST SYNC RECOVERY IN A WIRELESS TIME-SLOTTED LOW POWER AND LOSSY NETWORK BASED ON LOCALIZED SEARCH USING SUCCESSIVELY-SHIFTED GUARD TIME

(71) Applicant: Cisco Technology, Inc., San Jose, CA (US)

(72) Inventors: Pascal Thubert, Roquefort les Pins (FR); Jean-Philippe Vasseur, Saint Martin d'Uriage (FR); Eric Michel Levy-Abegnoli, Valbonne (FR); Patrick Wetterwald, Mouans Sartoux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 86 days.

(21) Appl. No.: 16/451,098

(22) Filed: Jun. 25, 2019

(65) Prior Publication Data

US 2020/0413354 A1 Dec. 31, 2020

(51) Int. Cl.
*H04W 56/00* (2009.01)
*H04W 84/18* (2009.01)

(52) U.S. Cl.
CPC ..... *H04W 56/001* (2013.01); *H04W 56/0035* (2013.01); *H04W 84/18* (2013.01)

(58) Field of Classification Search
CPC ........... H04W 56/001; H04W 56/0035; H04W 72/04; H04W 72/00; H04W 4/70;

(Continued)

(56) References Cited

U.S. PATENT DOCUMENTS 5,673,365 A 9/1997 Basehore et al.
8,670,374 B2 3/2014 Bata et al.
(Continued)

OTHER PUBLICATIONS

Thubert, Ed., et al., "Reliable and Available Wireless Technologies", [online], RAW Internet-Draft, Jun. 6, 2019, [retrieved on Jun. 7, 2019]. Retrieved from the Internet: URL: <https://tools.ietf.org/pdf/draft-thubert-raw-technologies-01.pdf>, pp. 1-20.

(Continued)

*Primary Examiner* — Hardikkumar D Patel
(74) *Attorney, Agent, or Firm* — Leon R. Turkevich (57) ABSTRACT

In one embodiment, a method comprises: detecting, by a constrained network device in a low power and lossy network, a loss of synchronization with a neighboring network device based on a determined absence of a prescribed transmission activity by the neighboring network device within a prescribed listening interval that is limited to a prescribed guard time according to a wireless time-slotted transmission protocol; and executing, by the constrained network device, localized sync recovery based on shifting a next listening interval to a shifted listening interval based on selectively shifting, based on a selected shift amount, the prescribed guard time of a corresponding next instance of the prescribed listening interval, enabling the constrained network device to recover synchronization with the neighboring network device based on detecting the prescribed transmission activity that is outside the prescribed listening interval and within the shifted listening interval.

20 Claims, 8 Drawing Sheets

(58) Field of Classification Search
CPC ... H04W 56/00; H04W 56/0015; H04W 4/00;
H04W 84/22; H04W 72/0446; H04W
84/005; H04W 28/06; H04W 52/02;
H04W 40/02; H04W 52/0203; H04W
28/065; H04W 84/20; H04W 84/18;
H04W 52/0219; H04J 3/06; H04J 3/0635;
H04J 3/0679; H04B 1/713; H04B 1/00;
H04B 1/7156; H04B 7/26; H04B 7/212;
H04L 27/2601; H04L 5/0067; H04L 1/00;
H04L 5/0007; H04L 5/003; H04L
2001/0097; H04L 67/12; H04L 29/08;
H04L 29/12; H04L 61/6059; H04L
29/08018; H04L 69/323; H04L 25/0218;
H04L 41/00; Y02D 30/70; Y02D 70/164;
Y02D 70/1224; Y02D 70/162; Y02D
70/142; Y02D 70/26; Y02D 70/166;
Y02D 70/1226; Y02D 70/146
See application file for complete search history.

(56) References Cited

U.S. PATENT DOCUMENTS

| | | | |
|---|---|---|---|
| 8,711,704 B2 | 4/2014 | Werb et al. | |
| 9,236,904 B2 * | 1/2016 | Hui | H04B 1/7156 |
| 9,351,301 B2 | 5/2016 | Lee et al. | |
| 9,673,858 B2 | 6/2017 | Hui et al. | |
| 9,801,150 B2 * | 10/2017 | Wetterwald | H04W 56/0045 |
| 9,992,703 B2 | 6/2018 | Wetterwald et al. | |
| 10,080,224 B2 * | 9/2018 | Thubert | H04W 72/0446 |
| 10,298,346 B2 | 5/2019 | Thubert et al. | |
| 2011/0228742 A1 | 9/2011 | Honkasalo et al. | |

OTHER PUBLICATIONS

Thubert et al., "IETF 6TSCH: Combining IPv6 Connectivity with Industrial Performance" [online], Jul. 2013, [retrieved on Nov. 9, 2017]. Retrieved from the Internet: <URL: https://www.researchgate.net/profile/Pascal_Thubert/publication/261430569_IETF_6TSCH_Combining_IPv6_Connectivity_with_Industrial_Performance/links/56c4887c08ae7fd4625a28c8/IETF-6TSCH-Combining-IPv6-Connectivity-with-Industrial-Performance.pdf?origin=publication_detail>, pp. 1-7.

Thubert, Ed., et al., "Reliable and Available Wireless Technologies", [online], RAW Internet-Draft, Jun. 6, 2019, [retrieved on Jun. 7, 2019]. Retrieved from the Internet: URL: <draft-thubert-raw-technologies-01.pdf>, pp. 1-20.

Vogli et al., "Fast network joining algorithms in Industrial IEEE 802.15.4 deployments", [online], Sep. 9, 2017 [retrieved on Jun. 10, 2019]. Retrieved from the Internet: URL: <https://telematics.poliba.it/publications/2018/FastJoinTSCH.pdf>, pp. 1-35.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Vilajosana, Ed., et al., "Minimal IPv6 over the TSCH Mode of IEEE 802.15.4e (6TiSCH) Configuration", Internet Engineering Task Force (IETF), Request for Comments: 8180, May 2017, pp. 1-28.

Roche, "Time Synchronization in Wireless Networks", [online], Apr. 23, 2006, [retrieved on Jun. 10, 2019]. Retrieved from the Internet: <URL: from https://www.cse.wustl.edu/~jain/cse574-06/ftp/time_sync/index.html>, pp. 1-12.

U.S. Appl. No. 16/432,661, filed Jun. 5, 2019, Zhao et al.

* cited by examiner

FAST SYNC RECOVERY IN A WIRELESS TIME-SLOTTED LOW POWER AND LOSSY NETWORK BASED ON LOCALIZED SEARCH USING SUCCESSIVELY-SHIFTED GUARD TIME

TECHNICAL FIELD

The present disclosure generally relates to fast sync recovery in a wireless time-slotted low power and lossy network based on a localized search using a successively-shifted guard time.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale low power and lossy networks (LLNs) rely on reliable time synchronization between wireless resource-constrained (e.g., low-power) network devices (also referred to herein as Low Power and Lossy Network (LLN) devices). For example, LLNs allow a large number (e.g., tens of thousands) of resource-constrained devices to be interconnected to form a wireless mesh network, based on deployment using wireless link layer protocols such as IEEE 802.15.4e Time Slotted Channel Hopping (TSCH) over Internet Protocol version 6(IPv6), also referred to as "6TiSCH"; such large-scale LLNs can be used for deployment of, for example, a connected grid mesh (CG-mesh) network advanced metering infrastructure (AMI).

LLN devices suffer from the problem of encountering difficulty in maintaining synchronization with neighboring LLN devices, hence the loss of synchronization can cause a "lost" LLN device to initiate a "restart" or "reboot" operation to attempt resynchronizing with a neighboring LLN device: hence, an entire subtree of the LLN may be lost during the "restart" operation of the "lost" LLN device acting as parent of the subtree; moreover, since neighboring LLN devices can have a relatively long sleep interval (e.g., hours or days), use of a randomized search in the "reboot" may cause the "lost" LLN device to continue its resynchronization for days or weeks before resynchronizing with the LLN.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

OVERVIEW

In one embodiment, a method comprises: detecting, by a constrained network device in a low power and lossy network, a loss of synchronization with a neighboring network device based on a determined absence of a prescribed transmission activity by the neighboring network device within a prescribed listening interval that is limited to a prescribed guard time according to a wireless time-slotted transmission protocol; and executing, by the constrained network device, localized sync recovery based on shifting a next listening interval to a shifted listening interval based on selectively shifting, based on a selected shift amount, the prescribed guard time of a corresponding next instance of the prescribed listening interval, enabling the constrained network device to recover synchronization with the neighboring network device based on detecting the prescribed transmission activity that is outside the prescribed listening interval and within the shifted listening interval.

In another embodiment, an apparatus is implemented as a physical machine and comprises non-transitory machine readable media configured for storing executable machine readable code, a device interface circuit, and a processor circuit. The device interface circuit is configured for detecting, within a prescribed listening interval, a prescribed transmission activity from a neighboring network device in a low power and lossy network. The apparatus is implemented as a constrained network device in the low power and lossy network. The processor circuit is configured for executing the machine readable code, and when executing the machine readable code operable for: detecting a loss of synchronization with the neighboring network device based on a determined absence of the prescribed transmission activity by the neighboring network device within the prescribed listening interval that is limited to a prescribed guard time according to a wireless time-slotted transmission protocol; and executing localized sync recovery based on shifting a next listening interval to a shifted listening interval based on selectively shifting, based on a selected shift amount, the prescribed guard time of a corresponding next instance of the prescribed listening interval, enabling the apparatus to recover synchronization with the neighboring network device based on detecting the prescribed transmission activity that is outside the prescribed listening interval and within the shifted listening interval.

In another embodiment, one or more non-transitory tangible media are encoded with logic for execution by a machine and when executed by the machine operable for: detecting, by the machine implemented as a constrained network device in a low power and lossy network, a loss of synchronization with a neighboring network device based on a determined absence of a prescribed transmission activity by the neighboring network device within a prescribed listening interval that is limited to a prescribed guard time according to a wireless time-slotted transmission protocol; and executing, by the constrained network device, localized sync recovery based on shifting a next listening interval to a shifted listening interval based on selectively shifting, based on a selected shift amount, the prescribed guard time of a corresponding next instance of the prescribed listening interval, enabling the constrained network device to recover synchronization with the neighboring network device based on detecting the prescribed transmission activity that is outside the prescribed listening interval and within the shifted listening interval.

DETAILED DESCRIPTION

Particular embodiments enable a constrained network device (also referred to as an "LLN device") to execute a fast sync recovery with a neighboring LLN device according to a wireless time-slotted transmission protocol in a low power and lossy network, based on the constrained network device executing a localized search of prescribed transmission activity (e.g., a preamble sequence at the beginning of a transmitted data packet) within a shifted listening interval using a successively-shifted guard time that is shifted from a prescribed guard time in a periodic sequence of the time-slotted transmission protocol. The example embodiments enable the constrained network device to recover synchronization based on detecting the prescribed transmission activity that is outside the prescribed listening interval and within the shifted listening interval.

Hence, the example embodiments can execute a localized search of the prescribed transmission activity by successively shifting the shifted listening interval, as appropriate, away from a corresponding instance of the prescribed listening interval, enabling the constrained network device to quickly recover synchronization and mitigate any adverse effects caused by the strict timing requirements of the prescribed listening interval according to the wireless time-slotted transmission protocol (e.g., 6TiSCH).

In particular, the example embodiments enable the constrained network device to quickly recover synchronization in response to losing synchronization with a neighboring LLN device due to a "wall of time" imposed by the prescribed listening interval. For example, conventional deployments of a LLN devices in an LLN using a prescribed wireless time-slotted transmission protocol typically require that the prescribed transmission activity (e.g., a preamble sequence of alternating "1"s and "0"s at the beginning of a link layer data packet that enables the receiver PHY to "lock" onto the transmitted bit stream at the beginning of the transmitted data packet) be detected within the prescribed listening interval: the prescribed listening interval is established by a prescribed time-based guard time to accommodate time-based variations between the actual transmit start instance of a transmitted data packet by the transmitting network device (using its corresponding clock), and the estimated transmit start instance as estimated by the receiving network device (using its corresponding clock); hence, receiving LLN device is configured for centering the prescribed guard time at its estimated transmit start instance to optimize timing variations between the estimated transmit start instance and the actual transmit start instance. Moreover, an LLN device may be required to return to a sleep state if the prescribed transmission activity (e.g., the preamble of a data packet) is not detected within prescribed guard time as clocked by the reference clock in the receiving LLN device.

Hence, even though a constrained LLN device and a transmitting neighbor LLN device may have incrementally-increasing errors (e.g., "drift") between their respective clocks, a constrained LLN device can suffer a "wall of time" that causes the constrained LLN device to lose synchronization with a neighboring device if the "drift" is sufficient that the constrained LLN device cannot detect the prescribed transmission activity (e.g., the preamble sequence) within the specific prescribed guard time, even though: (1) transmission has already started but the constrained LLN device was too late in initiating its prescribed listening interval and detecting the prescribed transmission activity, and therefore cannot synchronize to the bit stream in the transmitted data packet; or (2) the constrained LLN device executed its prescribed listening interval too early and was forced to go back to a sleep state just as the transmitting network device began transmission of the prescribed transmission activity at the beginning of the data packet transmission.

The above-described "wall of time" resulting in loss of synchronization can be encountered more often in LLN devices that require relatively long "sleep" intervals due to substantially long deployment requirements (e.g., 10 years or more) using constrained battery resources (limited Amp-Hours (AH)). In particular, LLN devices can encounter difficulty in maintaining synchronization with neighboring LLN devices, because each LLN device (e.g., sensor node, "dust" node, etc.) typically is implemented with a low-cost crystal that invariably encounters varying short-term and long-term drift in generation of a reference clock; however, each LLN device also is implemented with a low-cost (resource-constrained) battery that may require the LLN device to have relatively long "sleep" intervals (e.g., hours or days) as opposed to relatively short "active" intervals for transmission and/or reception of data packets (e.g., seconds or less), i.e., the LLN device is only permitted to wake up when "strictly necessary" (e.g., transmit or receive a data packet) in order to minimize energy consumption and/or network duty cycle. As described previously, an LLN device typically is required to return to a sleep state if a data packet preamble is not detected within the prescribed listening interval that is limited by the prescribed guard time (generated based on the reference clock in the LLN device).

Consequently, instances can arise where an LLN device can lose synchronization with a neighboring LLN device because the LLN device cannot detect (within a "detection window" based on its corresponding "receiving" reference clock) a data packet preamble transmitted by a neighboring LLN device (initiated at a "transmit start instance based on its corresponding "transmitting" reference clock). This loss of synchronization can cause the LLN device to become "lost" in the LLN network and initiate a "restart" or "reboot" operation to resynchronize itself in the LLN. The resynchronizing operations can result in substantially long recovery times, as the lost LLN node and the neighboring node may no longer be aligned with respect to time or transmission/reception frequencies, such that a beacon could be transmitted on one channel frequency, while the lost LLN node is listening on a different channel frequency.

As described in further detail below, example embodiments enable a constrained network device to recover its synchronization based on executing a localized search of the prescribed transmission activity (e.g., a preamble sequence at the beginning of a transmitted data packet) within a shifted listening interval using a successively-shifted guard time that is shifted from a prescribed guard time in a periodic sequence of the time-slotted transmission protocol; the constrained network device can use the same frequency channel sequence (e.g., according to 6TiSCH), in order to continue attempted synchronization as the neighboring transmitting LLN device changes its frequency channel.

Figure 1:
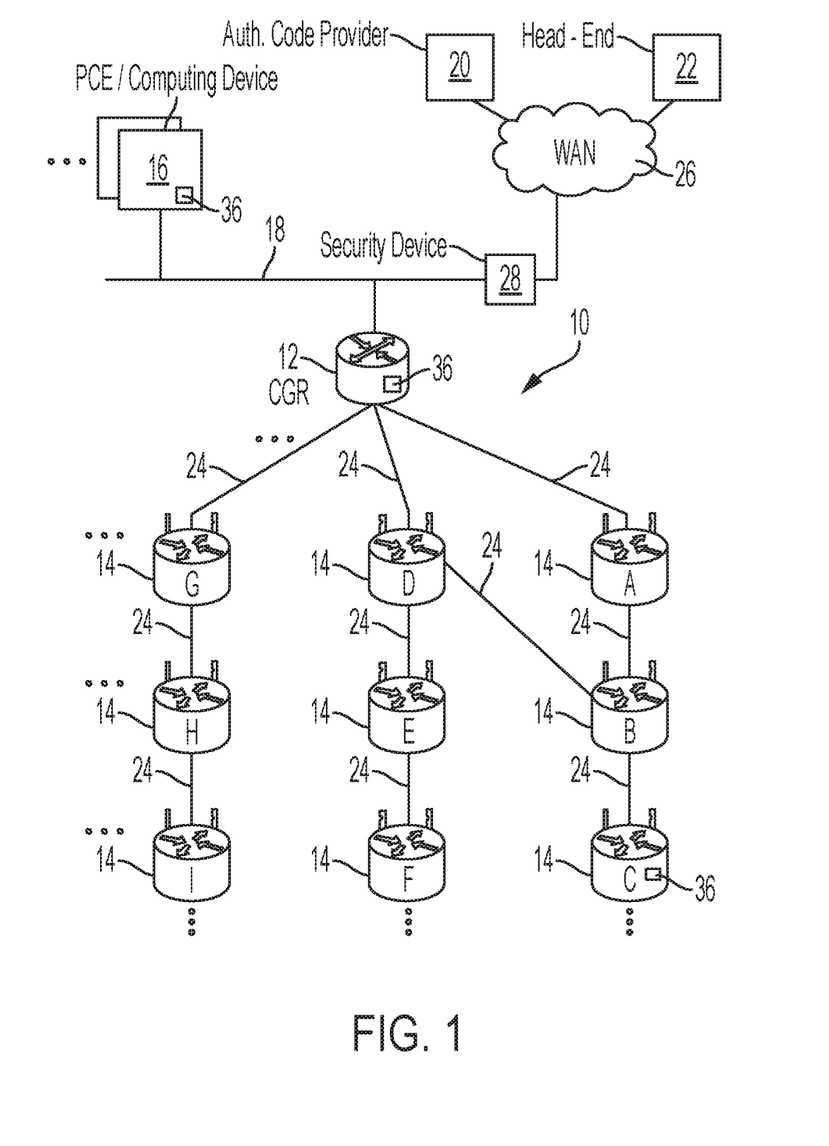
FIG. 1 illustrates an example system having an apparatus for executing fast sync recovery based on executing a localized search of a prescribed transmission activity within a shifted listening interval using a successively-shifted guard time, according to an example embodiment.

FIG. 1 illustrates an example wireless mesh data network 10, for example an IEEE 802.15.4e/g based low powered and lossy network (e.g., a CG-mesh network) having a root mesh network device 12 configured for operating as a directed acyclic graph (DAG) root for multiple wireless mesh network devices 14, according to an example embodiment. The root network device "CGR" 12 can be implemented, for example, as a commercially-available Cisco® 1000 Series Connected Grid Router (CGR) from Cisco Systems, San Jose, Calif., that is modified as described herein; hence, the root mesh network device 12 also is referred to as a CGR 12 or DAG root 12, or a root network device "CGR" 12.

The root network device "CGR" 12 can serve as a "sink" for the wireless mesh network devices 14; for example, the root network device "CGR" 12 enables the wireless mesh network devices 14 to reach one or more locally-reachable computing devices 16 via a backbone link 18, and/or one or more remote devices 20 (e.g., an authenticated software update provider or certificate authority), or 22 (e.g., a head-end device for sending or receiving data packets). The locally-reachable computing device 16 can be implemented as a network manager, for example a central path computation element (PCE) that can compute and install a track allocating a sequence of cells, according to a 6TiSCH architecture, for each hop along a path from a source to a destination. For example, 6TiSCH transmission protocol specifies a repeating Channel distribution/usage (CDU) matrix of "cells", each cell representing a unique wireless channel at a unique timeslot. The CDU is partitioned into prescribed "chunks", each chunk comprising multiple cells distributed in time and frequency (i.e., a different channel each timeslot). The 6TiSCH architecture specifies that a RPL parent device (described below) can allocate cells within an appropriated chunk to its first-hop child devices within its interference domain.

As illustrated in FIG. 1, each wireless mesh network device 14 in the wireless mesh data network 10 can establish a link layer mesh topology via wireless data links 24. Each wireless mesh network device 14 can be implemented as a constrained network device, or "LLN device" or "CG-mesh" device, configured for operating for example as a RPL node according to the Internet Engineering Task Force (IETF) Request for Comments (RFC) 6550. Hence, each wireless mesh network device 14 can establish a tree-based network topology overlying the wireless mesh data network 10, described below, that is rooted at the root network device "CGR" 12. Each of the network devices 12, 14, and 16 in the wireless mesh data network can be configured for transmitting data packets in periodically-repeating assigned time slots, for example according to a wireless time-slotted transmission protocol that can optionally utilize frequency hopping such as 6TiSCH, for example according to the IETF RFC 8180, entitled "Minimal IPv6 over the TSCH Mode of IEEE 802.15.43(6TiSCH) Configuration".

The PCE 16 is locally reachable by the root network device "CGR" 12 via the backbone link 18; in contrast, each remote device 20 is reachable via a wide area network (WAN) (e.g., the Internet) 26 that is separated from the backbone link 18 by a "demilitarized zone" (DMZ) 28 comprising, for example, at least a router device and a security appliance (e.g., "firewall") device (the router device and security appliance device can be integrated into a single security device, hence the "DMZ" 28 also is referred to as a security device 28 for simplicity).

The Root network device "CGR" 12 can be configured for causing creation of a tree-based topology overlying the link layer mesh data network 10 based on transmitting one or more DODAG information object (DIO) messages during scheduled time slots, for example according to RFC 6550 and RFC 8180. The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a wireless mesh network device 14 also can be referred to herein as a "RPL node" or a wireless network device. Each RPL node 14 in the LLN typically is constrained by processing power, memory, and energy (e.g., battery power); interconnecting wireless data links 24 between the RPL nodes 14 typically are constrained by high loss rates, low data rates, and instability with relatively low packet delivery rates.

A network topology (e.g., a "RPL instance" according to RFC 6550) can be established based on creating routes toward a single "root" network device 12 in the form of a directed acyclic graph (DAG) toward the root network device "CGR" 12, where all routes in the LLN terminate at the root network device "CGR" 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., node "C" or beyond) at scheduled time slots according to RFC 8180.

The DODAG can be formed based on a DODAG information object (DIO) advertised by the DAG root 12, where a "child" network device (e.g., "A") 14 detecting the DIO at a scheduled time slot can select the DAG root 12 as a parent in the identified DODAG based on comparing network topology metrics (advertised in the DIO) to a prescribed objective function of the RPL instance. The "child" network device (e.g., "A") 14, upon attaching to its parent, can output its own DIO at a scheduled time slot with updated network topology metrics that enable other wireless mesh network devices 14 to discover the DODAG, learn the updated network topology metrics, and select a DODAG parent.

A single instance of the DODAG or DAG also is referred to as a Personal Area Network (PAN). Hence, a wireless mesh data network 10 can include a plurality of PANs (not shown in FIG. 1), where each PAN includes one DAG root 12 (exclusively allocated to the PAN) and multiple wireless mesh network devices 14 connected exclusively within the PAN according to the DIO messages originated by the corresponding one DAG root 12. Hence, unless explicitly stated otherwise herein, a wireless mesh network device 14 is configured to belong to only one PAN at a time, i.e., a wireless mesh network device 14 is configured to be attached only within one DODAG, although the wireless mesh network device 14 can be configured for attachment to one or more parent network devices 14 within a single DODAG.

Downward routes (i.e., away from the DAG root) can be created based on Destination Advertisement Object (DAO) messages that are created by a wireless mesh network device 14 and propagated toward the DAG root 12 at scheduled time slots. The RPL instance can implement downward routes in the DAG of the LLN in either a storing mode only (fully stateful), or a non-storing mode only (fully source routed by the DAG root), or a combination thereof (e.g., some parent network devices operate in storing mode and one or more child network devices operate in non-storing mode only). In storing mode, a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Each mesh network device 14 in the wireless mesh data network 10 can be configured for operating in storing mode, non-storing mode, and/or a combination thereof. Hence, each wireless mesh network device 14 can unicast transmit its DAO message to its parent (and/or the DAG root 12) in accordance with RFC 6550 and/or RFC 8180. The DAG root 12, in response to receiving the DAO messages from the RPL nodes 14, can build the entire DAG topology and store the DAG topology in its memory circuit 34 (illustrated in FIG. 2), including storage of heuristics of usage, path length, knowledge of device capacity, link reliability, etc.

A wireless mesh network device 14 can operate as a parent network device (e.g., "B" of FIG. 1) for an attached "child" RPL node (e.g., "C"). For example, in response to a parent network device "B" receiving a data packet originated by its child network device "C" 14, the parent network device "B" can cache a downward path (i.e., away from the DAG root 12) that the target device "C" 14 is reachable via a given egress interface on the parent device "B" (e.g., output to an IPv6 address "B::C" that is the attachment address of the target device "C"); the next parent network device "A", in response to receiving the data packet from its child RPL node "B", can cache the downward path that the target device "C" 14 is reachable via the child RPL node "B".

Hence, each of the parent network devices "A", "B", etc. 14 can execute a caching (e.g., a transient caching on a temporary basis) of a downward path (i.e., away from the DAG root 12) for reaching the target network device "C" 14, independent of any route table entry in the parent network device; moreover, a common parent device (e.g., "D") 14 can cache downward paths toward multiple "target devices" (e.g., network devices "C" and "F") within its sub-DAG, such that a data packet originated by one RPL node "C" and destined toward another RPL node "F" can be forwarded by the common parent device (e.g., "D") to the corresponding parent device "E" of the destination target "F" eliminating the necessity that the data packet be forwarded via the default route toward the DAG root 12.

Figure 2:
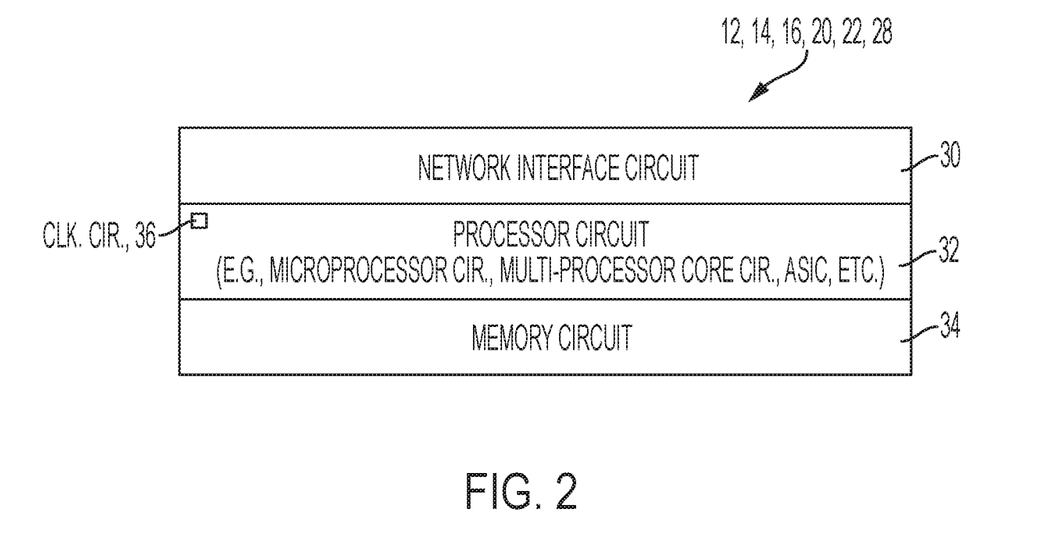
FIG. 2 illustrates an example implementation of any one of the network devices of FIG. 1, according to an example embodiment.

FIG. 2 illustrates an example implementation of any one of the devices 12, 14, 16, 20, 22, and/or 28 of FIG. 1, according to an example embodiment. Each device 12, 14, 16, 20, 22, and/or 28 is a physical machine (i.e., a hardware device) configured for communications with any other device 12, 14, 16, 20, 22, and/or 28.

Each apparatus 12, 14, 16, 20, 22, and/or 28 can include a device interface circuit 30, a processor circuit 32, a memory circuit 34, and a clock circuit 36. Although only the network devices 12, "C" 14, and 16 are indicated as comprising a clock circuit 36 FIG. 1 to avoid cluttering in the Figures, it should be apparent that all the network devices of FIGS. 1 and 2 (including "A" through "I" 14, the remote host devices 20 and 22, and the security device 28) each comprise a clock circuit 36.

The device interface circuit 30 can include one or more distinct physical layer transceivers for communication with any one of the other devices 12, 14, 16, 20, 22, and/or 28; the device interface circuit 30 also can include an IEEE based Ethernet transceiver for communications with the devices of FIG. 1 via any type of data link (e.g., a wired or wireless link, an optical link, etc.), for example a wireless IEEE 802.15.4e/g data link implemented in accordance with RFC 8180. For example, the root network device "CGR" 12 can have a wired transceiver for communications via the backbone link 18, and a wireless transceiver for communication with the wireless mesh network devices 14. Each computing device 16 and the security device can have a wired transceiver for communications via the backbone link 18, and optionally a wireless transceiver. Each wireless mesh network device 14 can include one or more wireless transceivers.

The processor circuit 32 can be configured for executing any of the operations described herein, and the memory circuit 34 can be configured for storing any data or data packets as described herein. The term "configured for" or "configured to" as used herein with respect to a specified operation refers to a device and/or machine that is physically constructed and arranged to perform the specified operation.

Any of the disclosed circuits of the devices 12, 14, 16, 20, 22, and/or 28 (including the device interface circuit 30, the processor circuit 32, the memory circuit 34, the clock circuit 36, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
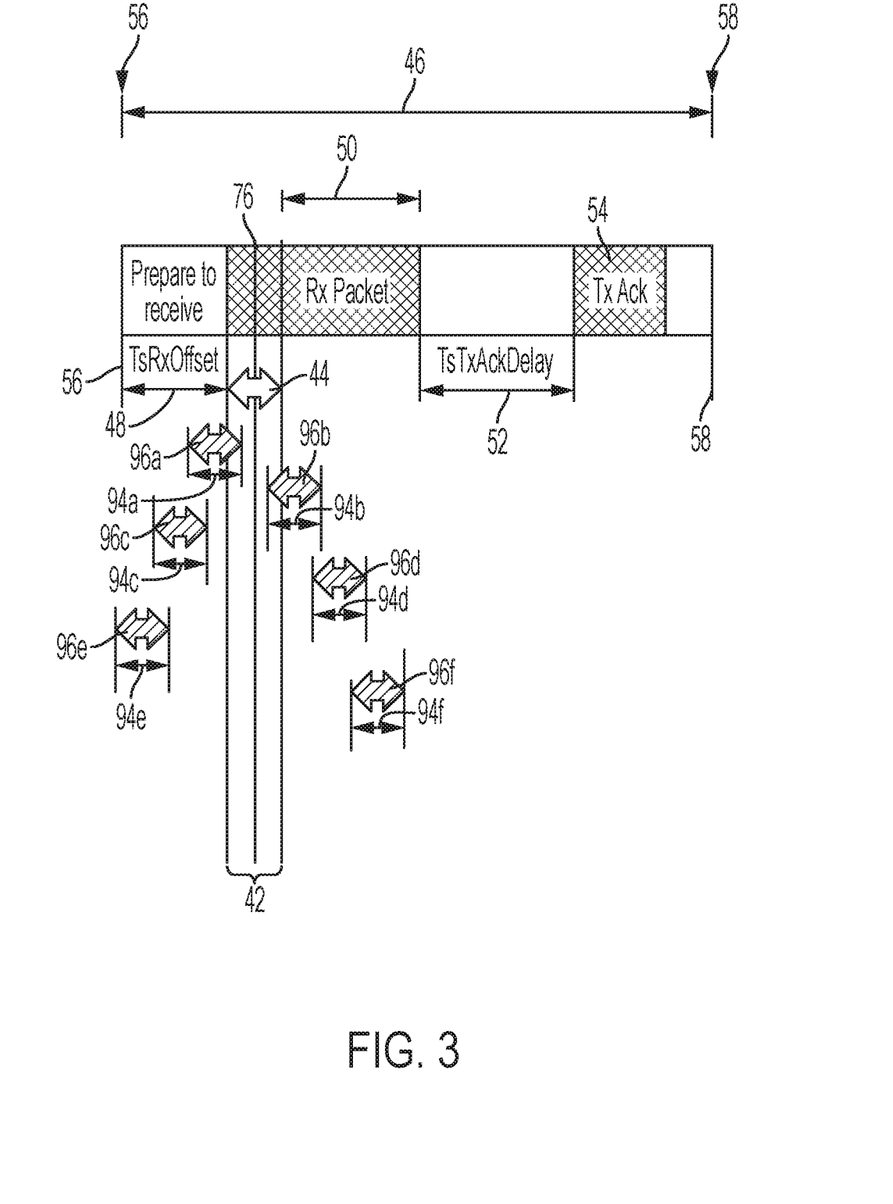
FIG. 3 illustrates executing a localized search of a prescribed transmission activity within a shifted listening interval using a successively-shifted guard time, according to an example embodiment.

FIG. 3 illustrates executing a localized search of a prescribed transmission activity within a shifted listening interval using a successively-shifted guard time, according to an example embodiment.

Figure 4A:
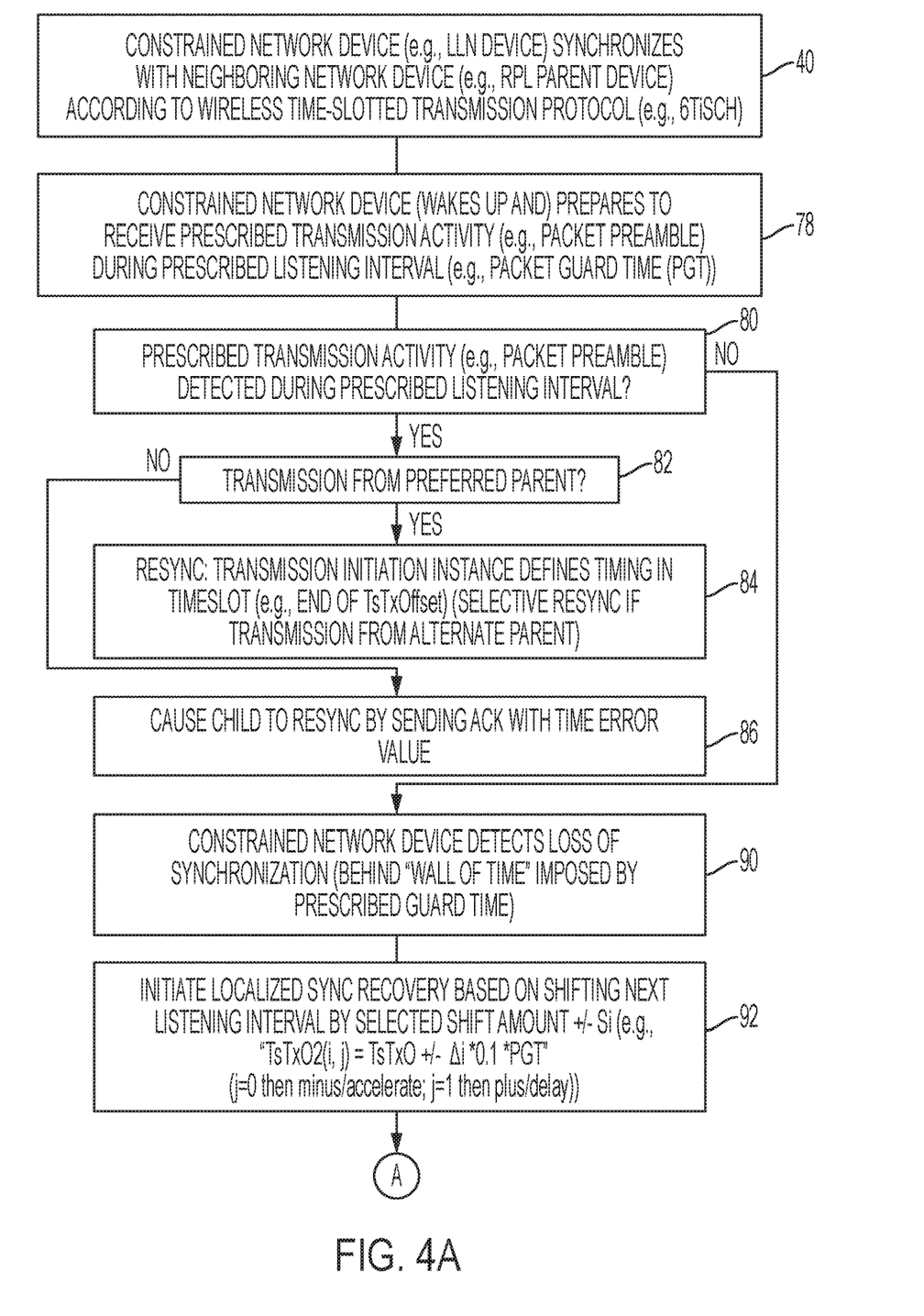
FIGS. 4A-4C illustrate execution of a fast sync recovery based on executing a localized search of a prescribed transmission activity within a shifted listening interval using a successively-shifted guard time, according to an example embodiment.
Figure 4B:
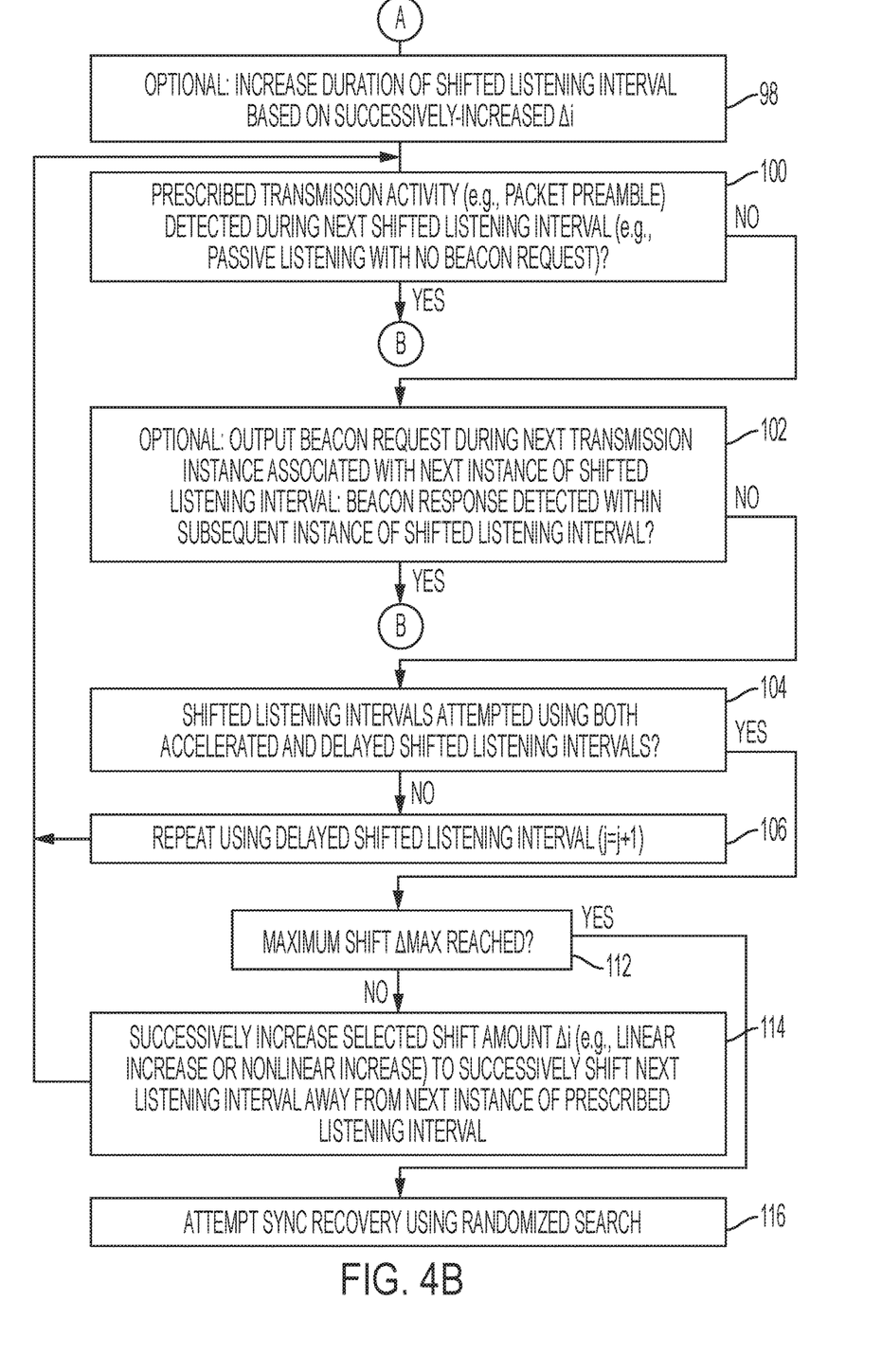
Figure 4C:
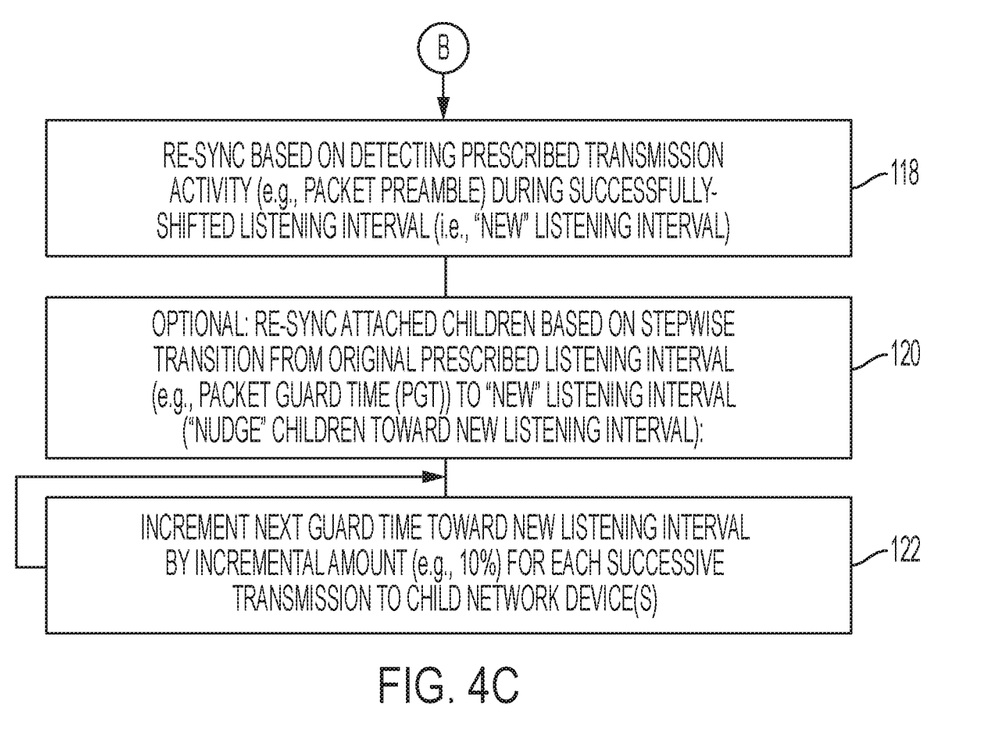

FIGS. 4A-4C illustrate execution of a fast sync recovery based on executing a localized search of a prescribed transmission activity within a shifted listening interval using a successively-shifted guard time, according to an example embodiment.

Figure 5A:
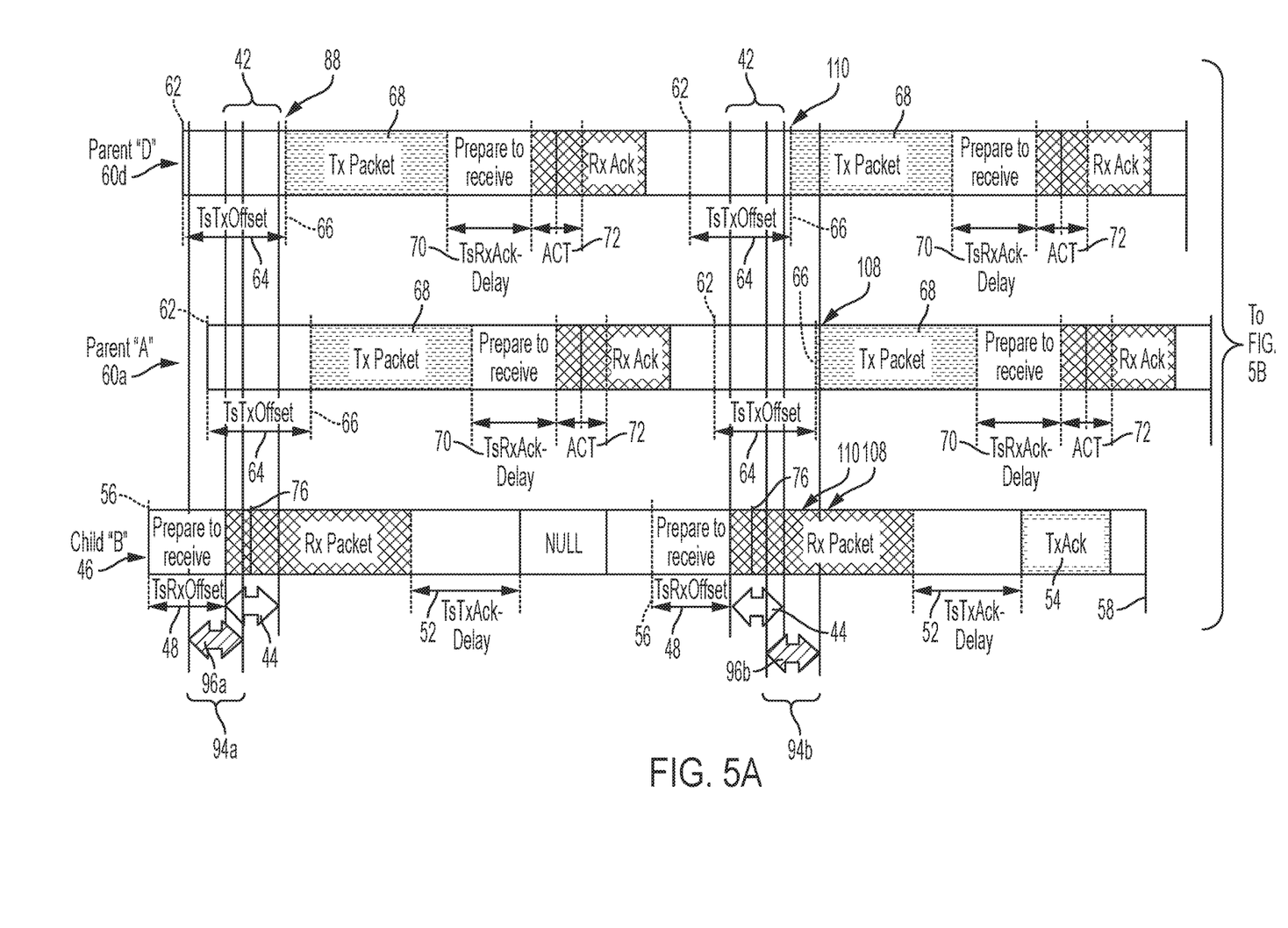
FIGS. 5A and 5B illustrate an example of a fast sync recovery based on executing a localized search of a prescribed transmission activity within a shifted listening interval using a successively-shifted guard time, according to an example embodiment.
Figure 5B:
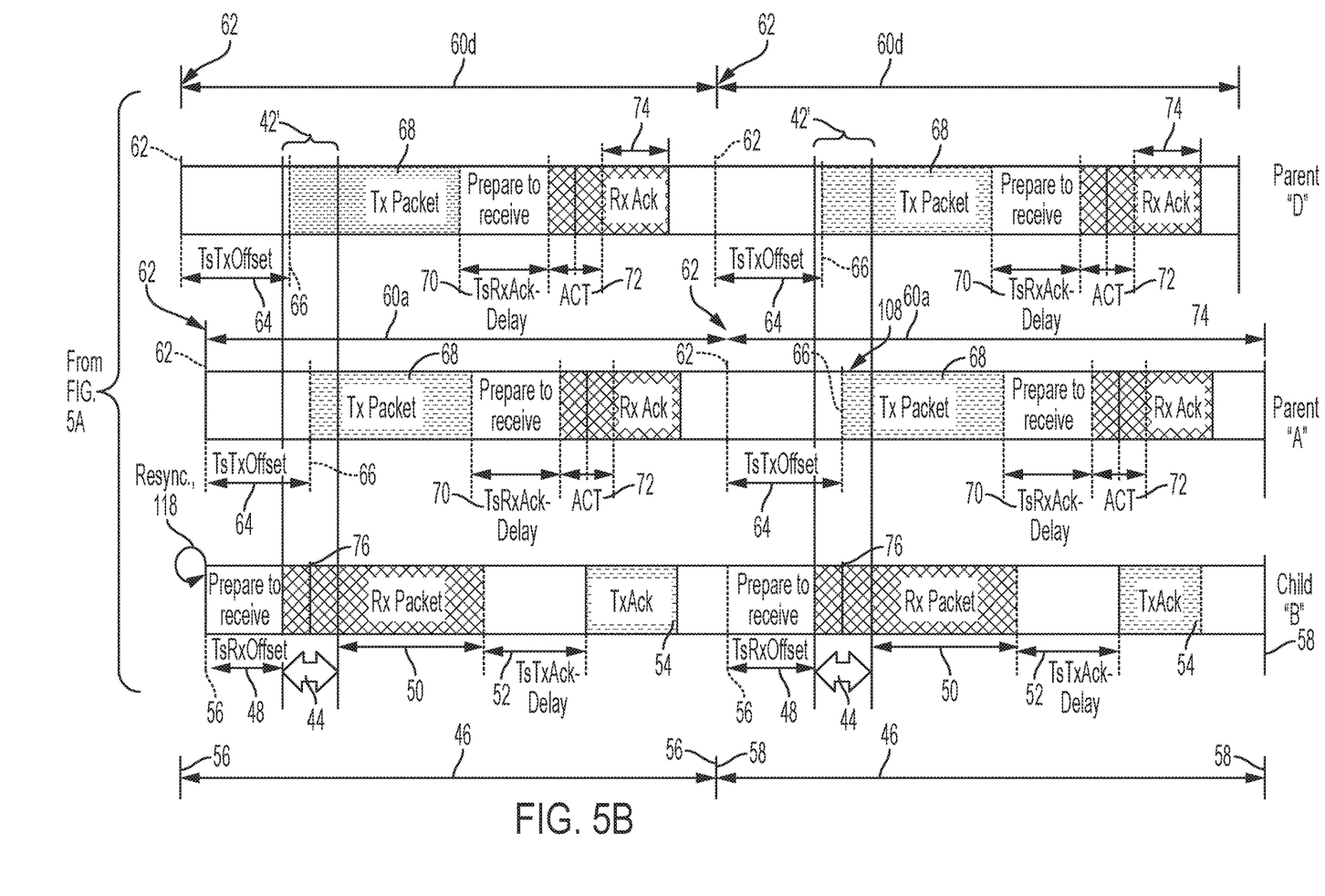

FIGS. 5A and 5B illustrate an example of a fast sync recovery based on executing a localized search of a prescribed transmission activity within a shifted listening interval using a successively-shifted guard time, according to an example embodiment. As described in further detail below, the disclosed operations related to maintaining and recovering synchronization can be executed by the device interface circuit 30 and/or the processor circuit 32 of an LLN device 14; for example, the device interface circuit 30 can include its own embedded processor core (not shown in FIG. 2) for executing the maintaining and recovering synchronization as described herein, for example in an implementation where the processor circuit 32 is configured to execute sensor-based operations and the device interface circuit 30 is configured to execute the synchronization operations described herein.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIGS. 3 and 4A, the device interface circuit 30 of a constrained network device (e.g., the LLN device "B" 14 of FIG. 1) in operation 40 can be configured for synchronizing with a neighboring network device (e.g., the parent LLN device "A" 14 at a scheduled frequency channel, for example in accordance with TSCH and/or RFC 8180) in response to detecting, during a prescribed listening interval 42 that is limited by a prescribed guard time (e.g., Packet Guard Time (PGT)) 44, a prescribed transmission activity (e.g., a preamble of a data packet) that is transmitted by a neighboring network device (e.g., the parent LLN device "A" 14) according to a wireless time-slotted transmission protocol such as IEEE 802.15.4. In particular, the device interface circuit 30 of each LLN device 14 and the root network device "CGR" 12 can be configured for detecting and receiving data packets within a repeatable receive slot interval (i.e., slot frame) 46 of FIG. 3 according to a prescribed schedule established by the PCE/computing device 16 (e.g., according to 6TiSCH).

FIGS. 5A and 5B illustrate a primary parent transmit slot interval 60a of the LLN device "A" 14 transmitting at repeating transmit slot intervals 60a, for example according to a first TSCH sequence, and a secondary or "alternate" parent LLN device "D" 14 transmitting at repeating transmit slot intervals 60d, for example according to a second TSCH sequence that is different than the first TSCH sequence allocated to the LLN device "A" 14. Hence, the receiving LLN device "B" 14 can receive data packets from either the primary parent LLN device "A" 14 or the alternate parent LLN device "D" 14 using the corresponding first TSCH sequence or the corresponding second TSCH sequence. Hence, FIGS. 5A and 5B illustrate that the receiving LLN device "B" 14 can receive from either the primary parent LLN device "A" 14 or the alternate parent LLN device "D" 14 at different instances of the repeatable transmit slot intervals 60.

The prescribed receive slot time 46 illustrated in FIGS. 3, 5A and 5B has a prescribed (i.e., fixed) duration and includes a prescribed "prepare to receive" interval (e.g., "TxRxOffset") 48, the prescribed listening interval 42 defined by the prescribed PGT 44, followed by a prescribed remaining packet reception interval 50 for receiving a transmitted data packet (assuming the prescribed transmission activity (e.g., preamble) is detected during the prescribed listening interval 42), a prescribed acknowledgment message transmission delay interval ("TsTxAckDelay") 52 following the remaining packet reception interval 50, followed by a prescribed ack transmission interval 54 reserved for transmission of an acknowledgment message in response to successful transmission of the data packet during the remaining packet reception interval 50.

Hence, the receive slot time 46 begins at the receive slot initiation instance 56 with initiation of the "prepare to receive" interval ("TsRxOffset") 48, and the receive slot time 46 ends at the receive slot termination instance 58 following completed transmission of the acknowledgment message during the receiver ack transmission interval 54.

As illustrated in FIG. 5B, the receive slot time 46 generated by an LLN device 14 normally is expected to be substantially synchronized with a prescribed transmit slot interval 60 of a transmitting network device (e.g., 60a of a primary parent LLN device "A" 14 and/or 60d of an alternate parent LLN device "D" 14), where the "substantially synchronized" requires the receive slot initiation instance 56 of the receive slot time 46 to coincide in time with the corresponding transmit slot initiation instance 62 of a transmit slot interval 60 within one-half the prescribed PGT 44 (i.e., any variation between the receive slot initiation instance 56 and the transmit slot initiation instance 62, "plus or minus", is within the prescribed PGT 44). As illustrated in FIGS. 5A and 5B, each transmit slot interval 60 comprises a prescribed transmit wait interval ("TsTxOffset") 64 initiated at the corresponding transmit slot initiation instance 62, followed by a preamble transmission instance 66 that initiates transmission of a prescribed transmission activity (e.g., a preamble) at a beginning of a prescribed packet transmission interval 68 for a transmitted data packet. The packet transmission interval 68 is followed by a prescribed acknowledgment message reception delay interval ("TsRxAckDelay") 70, which is followed by a prescribed acknowledgment guard time (AGT) 72 for detecting a corresponding preamble of the acknowledgment message transmitted by a receiving network device (e.g., LLN device "C" 14) during the corresponding receiver ack transmission interval 54. The transmit slot interval 60 also includes a remaining acknowledgment reception interval 74 to complete reception of the acknowledgment message following the corresponding preamble.

Example time values for the above identified receive slot time 46 and transmit slot intervals 60 are illustrated in RFC 8180 at Appendix A2. The time value for the prescribed PGT 44 can be set, for example by an administrator via the PCE/computing device 16.

Hence, the device interface circuit 30 and/or the processor circuit 32 of each LLN device 14, the root network device "CGR" 12, and/or the PCE/computing device 16 can be configured for identifying each of the above-identified time interval values for implementation of each transmit slot interval 60 for transmission of a data packet according to the prescribed wireless time-slotted transmission protocol, and for implementation of each corresponding receive slot time 46 for reception of the transmitted data packet according to the prescribed wireless time-slotted transmission protocol.

As described previously, the receive slot time 46 generated by an LLN device 14 normally is expected to be substantially synchronized with a corresponding transmit slot interval 60 of a transmitting network device (e.g., 60a of a primary parent LLN device "A" 14 and/or 60d of an alternate parent LLN device "D" 14), where the "substantially synchronized" requires the receive slot initiation instance 56 of the receive slot time 46 to coincide in time with the corresponding transmit slot initiation instance 62 of a transmit slot interval 60 within the prescribed PGT 44, i.e., the difference between the receive slot initiation instance 56 and the transmit slot initiation instance 62 is expected to be less than one half the prescribed PGT 44. Hence, the estimated transmit start instance 76 of FIGS. 3, 5A and 5B can be estimated by the device interface circuit 30 and/or the processor circuit 32 of the receiving network device (e.g., the LLN device "B" 14) to coincide with the preamble transmission instance 66 based on setting the estimated transmit start instance 76 by the prescribed transmit wait interval ("TsTxOffset") 64 following its localized receive slot initiation instance 56. Hence, prior deployments assumed that any variation between the estimated transmit start instance 76 and the preamble transmission instance 66 could be absorbed by the prescribed listening interval 42 defined by the prescribed PGT 44.

Hence, if the device interface circuit 30 and/or the processor circuit 32 of a receiving LLN device "B" 14 in operation 78 wakes up and prepares to receive the prescribed transmission activity (e.g., preamble) of a scheduled data packet, the device interface circuit 30 and/or the processor circuit 32 of the receiving LLN device "B" 14 can respond to detecting the packet preamble during the prescribed listening interval 42 in operation 80 by initiating resync operations in operation 82: if the device interface circuit 30 and/or the processor circuit 32 of the receiving LLN device "B" 14 in operation 82 determines the transmitted data packet is from a parent network device (e.g., preferred parent LLN device "A" 14 and/or alternate parent LLN device "D" 14), the device interface circuit 30 and/or the processor circuit 32 of the receiving LLN device "B" 14 in operation 84 can resync with the parent network device based on resetting its estimated transmit start instance 76 to coincide with the preamble transmission instance 66 (in actual implementation, the processor circuit 32 can determine the difference between the estimated transmit start instance 76 and the preamble transmission instance 66 and apply the difference at the next instance of the receive slot initiation instance 56 for the next receive slot time 46); in the case of an alternate parent LLN device "D" 14, the device interface circuit 30 and/or the processor circuit 32 of the receiving LLN device "B" 14 in operation 84 can execute selective (e.g., partial) resynchronization toward the alternate parent LLN device 14 to ensure the receiving LLN device "B" 14 does not lose synchronization with its primary parent LLN device "A" 14. If the device interface circuit 30 and/or the processor circuit 32 of the receiving LLN device "B" 14 in operation 82 determines the transmitted data packet is from a child network device (e.g., the child LLN device "C" 14), the device interface circuit 30 and/or the processor circuit 32 of the receiving LLN device "B" 14 in operation 86 can cause the transmitting child network device (e.g., the child LLN device "C" 14) to resync with the receiving LLN device "B" 14 based on determining the difference between the estimated transmit start instance 76 and the preamble transmission instance 66, and supplying the difference in the acknowledgment message transmitted by the receiving LLN device "B" 14 during the receiver ack transmission interval 54.

As illustrated in FIG. 5A, the clock circuit 36 of a receiving LLN device "B" 14 may encounter sufficient drift relative to its primary parent LLN device "A" 14 (and/or its alternate parent transmit slot interval 60d) that exceeds one-half the prescribed PGT 44. Hence, the device interface circuit 30 and/or the processor circuit 32 of a receiving LLN device "B" 14, in response to preparing to receive in operation 78 the prescribed transmission activity (e.g., preamble) of a scheduled data packet during the prescribed listening interval 42 defined by the prescribed PGT 44, can determine in operation 80 an absence of the prescribed transmission activity (event 88 of FIG. 5A) during the prescribed listening interval 42 defined by the prescribed PGT 44.

According to an example embodiment, the device interface circuit 30 and/or the processor circuit 32 of the receiving LLN device "B" 14 can respond to detecting in operation 90 the loss of synchronization, i.e., the "wall of time" imposed by the prescribed listening interval 42 defined by the prescribed PGT 44, by initiating in operation 92 a localized sync recovery.

The device interface circuit 30 and/or the processor circuit 32 of the receiving LLN device "B" 14 in operation 92 can initiate localized sync recovery based on shifting the next listening interval to a shifted listening interval (94 of FIGS. 3 and 5A) defined by a shifted guard time (96 of FIGS. 3 and 5A). As illustrated in FIGS. 3 and 4A, the device interface circuit 30 and/or the processor circuit 32 of the receiving LLN device "B" 14 in operation 92 can shift the next listening interval in the corresponding receive time slot 46 to a shifted listening interval 94a defined by the corresponding shifted guard time 96a, based on shifting the next guard time (e.g., "TsTxO2(i,j)") from the estimated transmit start instance ("TsTxO") 76 by a selected shift amount "Si =Δi*O1*PGT", e.g.:

$$TsTxO2(i, j) = TsTxO +/- \Delta i * 0.1 * PGT \qquad (1),$$

where "PGT" equals the time value of the prescribed PGT 44 (e.g., in milliseconds), "TsTxO" equals the current value of the estimated transmit start instance 76 (offset relative to the corresponding receive slot initiation instance 56), "i" equals an iteration value ("i=1, 2, 3, . . . , max), "j" toggles between "0" indicating a subtraction (minus) operation or "1" indicating an addition (plus) operation, and "Δi" refers to successively-increasing multiplier value that can have a linearly-increasing value (e.g., 2, 4, 6, 8, 10, etc.) or a nonlinear/exponential value (e.g., 2, 4, 8, 16, 32, 64, etc.) (the symbol "*" represents a multiplication operation).

Hence, FIG. 3 illustrates successive shifted listening intervals 94 defined by respective shifted guard times 96, for example: the shifted listening interval 94a (defined by the shifted guard time 96a at instance "TsTxO2(1, 0)") is shifted "to the left" of the prescribed PGT 44 and therefore accelerates the shifted listening interval 94a relative to the prescribed listening interval 42; the shifted listening interval 94b (defined by the shifted guard time 96b at instance "TsTxO2(1, 1)" is shifted "to the right" of the prescribed PGT 44 and therefore delays the shifted listening interval 94b relative to the prescribed listening interval 42; the shifted listening interval 94c (defined by the shifted guard time 96c at instance "TsTxO2(2, 0)") is shifted "to the left" of the shifted listening interval 94a and therefore accelerates the shifted listening interval 94c relative to the shifted listening interval 94a; the shifted listening interval 94d (defined by the shifted guard time 96d at instance "TsTxO2 (2, 1)" is shifted "to the right" of the shifted listening interval 94b and therefore delays the shifted listening interval 94d relative to the shifted listening interval 94b; the shifted listening interval 94e (defined by the shifted guard time 96e at instance "TsTxO2(3, 0)") is shifted "to the left" of the shifted listening interval 94c and therefore accelerates the shifted listening interval 94e relative to the shifted listening interval 94c; and the shifted listening interval 94f (defined by the shifted guard time 96f at instance "TsTxO2(3, 1)" is shifted "to the right" of the shifted listening interval 94d and therefore delays the shifted listening interval 94f relative to the shifted listening interval 94d.

Hence, the device interface circuit 30 and/or the processor circuit 32 of the receiving LLN device 14 in operation 92 can initiate sync recovery based on successively shifting the next listening interval to a shifted listening interval 94 by a selected shift amount.

Referring to FIG. 4B, the device interface circuit 30 and/or the processor circuit 32 of the receiving LLN device "B" 14 in operation 98 also can optionally increase the duration of the corresponding shifted guard time 96 based on the successively-increasing multiplier "Δi", as desired.

If in operation 100 the device interface circuit 30 and/or the processor circuit 32 of the receiving LLN device "B" 14 does not detect any transmission activity, let alone the prescribed transmission activity (e.g., the preamble) using the current shifted listening interval 94a defined by the shifted guard time 96a, as illustrated at event 88 of FIG. 5A, the device interface circuit 30 and/or the processor circuit 32 of the receiving LLN device "B" 14 can optionally transmit in operation 102 a beacon request during its next instance of the scheduled transmit slot interval 60, and determine in operation 102 whether a beacon response is detected at the current shifted listening interval (e.g., 94) for the next instance of its corresponding receive slot time 46. If in operation 102 the preamble of a beacon response is detected during the current shifted listening interval 94, the device interface circuit 30 and/or the processor circuit 32 of the receiving LLN device "B" 14 can resynchronize in operation 118 of FIG. 4C, as described above with respect to operations 84 and/or 86, including resetting its estimated transmit start instance 76 to coincide with the preamble transmission instance 66 to establish a "new" listening interval 42' (illustrated in FIG. 5B).

If in operation 100 or 102 the device interface circuit 30 and/or the processor circuit 32 of the receiving LLN device "B" 14 does not detect any transmission activity, let alone the prescribed transmission activity (e.g., the preamble) using the current shifted listening interval 94 (e.g., 94a), the device interface circuit 30 and/or the processor circuit 32 of the receiving LLN device "B" 14 in operations 104 and 106 can shift to the corresponding delayed shifted listening interval (e.g., 94b) and repeat operation 100 in the next instance of the receive slot time 46.

As illustrated in FIG. 5A, the device interface circuit 30 and/or the processor circuit 32 of the receiving LLN device "B" 14 in operation 100 can recover synchronization with the parent LLN device "A" 14 in response to detecting at event 108 the prescribed transmission activity (e.g., the preamble) of the data packet transmitted by the parent LLN device "A" 14 at the preamble transmission instance 66 of a first transmit slot interval 60a (e.g., at a prescribed channel frequency allocated to the LLN device "A" 14 according to a prescribed TSCH schedule by the PCE/computing device 16), and executing operation 118 (in FIGS. 4C and 5B) to re-sync to a "new" listening interval 42'. As illustrated in FIG. 5A, the device interface circuit 30 and/or the processor circuit 32 of the receiving LLN device "B" 14 in operation 100 can recover synchronization with the alternate parent LLN device "D" 14 in response to detecting at event 110 the prescribed transmission activity (e.g., the preamble) of the data packet transmitted by the alternate parent LLN device "D" 14 at the preamble transmission instance 66 of a second different transmit slot interval 60d (e.g., at a prescribed channel frequency allocated to the LLN device "D" 14 according to a different prescribed TSCH schedule by the PCE/computing device 16), and executing operation 118 (in FIGS. 4C and 5B) to re-sync to a "new" listening interval 42'.

Hence, the example embodiments enable a receiving LLN device "B" 14 to recover synchronization with one or more neighboring LLN devices based on shifting its listening interval outside the prescribed listening interval.

As described previously with respect to FIG. 3, if in operation 100 there still is no transmission activity detected within the current shifted listening interval (e.g., 94b), the device interface circuit 30 and/or the processor circuit 32 of the receiving LLN device "B" 14 in operations 112 and 114 can successively increase the selected shift amount "+/−Si" to shift to the next shifted listening intervals (e.g., 94c, 94d, 94e, 94f, etc.), until either detecting the prescribed transmission activity for a transmitted data packet (in operation 100), detecting transmitted energy on the wireless medium (described below), or reaching the maximum shift in operation 112.

In particular, if in operation 100 the device interface circuit 30 and/or the processor circuit 32 of the receiving LLN device "B" 14 detects transmitted energy of the wireless medium (but not the prescribed transmission activity implemented, for example, as the preamble), the device interface circuit 30 and/or the processor circuit 32 of the receiving LLN device "B" 14 can determine that it has detected the remaining data packet transmission during the corresponding packet transmission interval 68 that follows the preamble, and in response update its localized search by further accelerating the next shifted listening interval 94. For example, in response to the device interface circuit 30 and/or the processor circuit 32 of the receiving LLN device "B" 14 in operation 100 detecting transmitted energy during the shifted listening interval 94a (without being able to decode the transmitted data stream), the device interface circuit 30 and/or the processor circuit 32 of the receiving LLN device "B" 14 can further shift "to the left" to accelerate the next shifted listening to the shifted listening interval 94c during the next instance of the receive slot time 46; hence, if the device interface circuit 30 and/or the processor circuit 32 of the receiving LLN device "B" 14 in operation 100 detecting transmitted energy during the shifted listening interval 94c (without being able to decode the transmitted data stream), the device interface circuit 30 and/or the processor circuit 32 of the receiving LLN device "B" 14 can further shift "to the left" to accelerate the next shifted listening to the shifted listening interval 94e during the next instance of the receive slot time 46, etc., until reaching detection of the prescribed transmission activity at the beginning of the transmission of the transmitted data packet and executing operation 118 of FIG. 4C accordingly.

As shown in FIG. 4B, if the foregoing still results in a failure to recover the synchronization, the device interface circuit 30 and/or the processor circuit 32 of the receiving LLN device "B" 14 in operation 116 can attempt sync recovery using a randomized search as a last resort.

According to example embodiments, a network device in a subDAG can execute a fast sync recovery based on a localized search around its prescribed listening interval 42 using successively shifted guard times 96. The example embodiments enable a network device to "look around the wall of time" to recover a preamble sequence that is transmitted marginally outside its existing prescribed listening interval 42.

FIG. 4C also illustrates optional stepwise resynchronization of one or more attached child network devices (e.g., the child LLN device "D" 14). In particular, assuming that the parent LLN device "B" 14 has successfully recovered synchronization with its parent LLN devices "A" and "D" 14 as described above (e.g., based on shifting from the prescribed listening interval 42 to the shifted listening interval 94e), the device interface circuit 30 and/or the processor circuit 32 of the parent LLN device "B" 14 in operation 120 can execute a stepwise transition for the attached child LLN device "C" 14 from the prescribed listening interval 42 to the "new" shifted listening interval 94e based on incrementing in operation 122 the guard time from the initial prescribed PGT 44 to an incrementally-shifted listening interval (e.g., 94a defined by the shifted guard time 96a) for the next scheduled transmission to the child LLN device "C" 14; the parent LLN device "B" 14 can successively increment in operation 122 the guard time to the next incrementally-shifted listening interval (e.g. 94c defined by the shifted guard time 96c) for the next scheduled transmission to the child LLN device "C" 14; finally, the parent LLN device "B" 14 can successively increment in operation 122 the guard time to the next incrementally-shifted listening interval (e.g. 94e defined by the shifted guard time 96e) for the next scheduled transmission to the child LLN device "C" 14, enabling the parent LLN device "B" 14 to "nudge" the child LLN device "C" 14 toward the shifted listening interval 94e, without any loss of synchronization with the child LLN device "B" 14.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting, by a constrained network device in a low power and lossy network, a loss of synchronization with a neighboring network device based on a determined absence of a prescribed transmission activity by the neighboring network device within a prescribed listening interval that is limited to a prescribed guard time according to a wireless time-slotted transmission protocol; and
   executing, by the constrained network device, localized sync recovery based on shifting a next listening interval to a shifted listening interval based on selectively shifting, based on a selected shift amount, the prescribed guard time of a corresponding next instance of the prescribed listening interval, enabling the constrained network device to recover synchronization with the neighboring network device based on detecting the prescribed transmission activity that is outside the prescribed listening interval and within the shifted listening interval.

2. The method of claim 1, wherein the executing includes at least one or more of:
   first shifting a corresponding next listening interval based on accelerating a corresponding shifted listening interval to start before the corresponding next instance of the prescribed listening interval by at least the selected shift amount; or
   second shifting a corresponding next listening interval based on delaying a corresponding shifted listening interval to start after the corresponding next instance of the prescribed listening interval by at least the selected shift amount.

3. The method of claim 2, wherein the executing further includes:
   successively increasing the selected shift amount based on a corresponding determined absence of the prescribed transmission activity following the first shifting and the second shifting; and
   repeating, for each successively increased selected shift amount, the first and shifting and second shifting of accelerating the shifted listening interval and delaying the corresponding shifted listening interval, in response to a corresponding determined absence of the prescribed transmission activity in the corresponding shifted listening interval.

4. The method of claim 1, wherein the executing includes:
   successively shifting the next listening interval away from the corresponding next instance of the prescribed listening interval, until detection of the prescribed transmission activity within one of the shifted listening intervals; and
   resynchronizing with the neighboring network device in response to detecting the prescribed transmission activity within the one shifted listening interval.

5. The method of claim 4, wherein the executing includes:
   transmitting a beacon request within a first transmission instance associated with a first instance of one of the shifted listening intervals; and
   determining whether a beacon response is detected within a second instance, following the first instance, of the one shifted listening interval.

6. The method of claim 1, wherein the localized sync recovery is based on passive detection in one or more of the shifted listening intervals without transmission of any beacon request.

7. The method of claim 1, further comprising causing sync recovery for child network devices, having attached to the constrained network device, based on stepwise transition from the prescribed listening interval to the shifted listening interval for data packets transmitted to the child network devices.

8. An apparatus implemented as a physical machine, the apparatus comprising:
non-transitory machine readable media configured for storing executable machine readable code;
a device interface circuit configured for detecting, within a prescribed listening interval, a prescribed transmission activity from a neighboring network device in a low power and lossy network; and
a processor circuit configured for executing the machine readable code, and when executing the machine readable code operable for:
detecting, by the apparatus implemented as a constrained network device in the low power and lossy network, a loss of synchronization with the neighboring network device based on a determined absence of the prescribed transmission activity by the neighboring network device within the prescribed listening interval that is limited to a prescribed guard time according to a wireless time-slotted transmission protocol, and
executing localized sync recovery based on shifting a next listening interval to a shifted listening interval based on selectively shifting, based on a selected shift amount, the prescribed guard time of a corresponding next instance of the prescribed listening interval, enabling the apparatus to recover synchronization with the neighboring network device based on detecting the prescribed transmission activity that is outside the prescribed listening interval and within the shifted listening interval.

9. The apparatus of claim 8, wherein the processor circuit is configured for executing the localized sync recovery based on at least one or more of:
first shifting a corresponding next listening interval based on accelerating a corresponding shifted listening interval to start before the corresponding next instance of the prescribed listening interval by at least the selected shift amount; or
second shifting a corresponding next listening interval based on delaying a corresponding shifted listening interval to start after the corresponding next instance of the prescribed listening interval by at least the selected shift amount.

10. The apparatus of claim 9, wherein the processor circuit further is configured for executing the localized sync recovery based on:
successively increasing the selected shift amount based on a corresponding determined absence of the prescribed transmission activity following the first shifting and the second shifting; and
repeating, for each successively increased selected shift amount, the first and shifting and second shifting of accelerating the shifted listening interval and delaying the corresponding shifted listening interval, in response to a corresponding determined absence of the prescribed transmission activity in the corresponding shifted listening interval.

11. The apparatus of claim 8, wherein the processor circuit is configured for executing the localized sync recovery based on:
successively shifting the next listening interval away from the corresponding next instance of the prescribed listening interval, until detection of the prescribed transmission activity within one of the shifted listening intervals; and
resynchronizing with the neighboring network device in response to detecting the prescribed transmission activity within the one shifted listening interval.

12. The apparatus of claim 11, wherein the processor circuit further is configured for executing the localized sync recovery based on:
transmitting a beacon request within a first transmission instance associated with a first instance of one of the shifted listening intervals; and
determining whether a beacon response is detected within a second instance, following the first instance, of the one shifted listening interval.

13. The apparatus of claim 8, wherein the processor circuit is configured for executing the localized sync recovery based on based on passive detection in one or more of the shifted listening intervals without transmission of any beacon request.

14. The apparatus of claim 8, wherein the processor circuit is configured for causing sync recovery for child network devices, having attached to the constrained network device, based on stepwise transition from the prescribed listening interval to the shifted listening interval for data packets transmitted to the child network devices.

15. One or more non-transitory tangible media encoded with logic for execution by a machine and when executed by the machine operable for:
detecting, by the machine implemented as a constrained network device in a low power and lossy network, a loss of synchronization with a neighboring network device based on a determined absence of a prescribed transmission activity by the neighboring network device within a prescribed listening interval that is limited to a prescribed guard time according to a wireless time-slotted transmission protocol; and
executing, by the constrained network device, localized sync recovery based on shifting a next listening interval to a shifted listening interval based on selectively shifting, based on a selected shift amount, the prescribed guard time of a corresponding next instance of the prescribed listening interval, enabling the constrained network device to recover synchronization with the neighboring network device based on detecting the prescribed transmission activity that is outside the prescribed listening interval and within the shifted listening interval.

16. The one or more non-transitory tangible media of claim 15, wherein the executing includes at least one or more of:
first shifting a corresponding next listening interval based on accelerating a corresponding shifted listening interval to start before the corresponding next instance of the prescribed listening interval by at least the selected shift amount; or
second shifting a corresponding next listening interval based on delaying a corresponding shifted listening interval to start after the corresponding next instance of the prescribed listening interval by at least the selected shift amount.

17. The one or more non-transitory tangible media of claim 15, wherein the executing includes:
- successively shifting the next listening interval away from the corresponding next instance of the prescribed listening interval, until detection of the prescribed transmission activity within one of the shifted listening intervals; and
- resynchronizing with the neighboring network device in response to detecting the prescribed transmission activity within the one shifted listening interval.

18. The one or more non-transitory tangible media of claim 17, wherein the executing includes:
- transmitting a beacon request within a first transmission instance associated with a first instance of one of the shifted listening intervals; and
- determining whether a beacon response is detected within a second instance, following the first instance, of the one shifted listening interval.

19. The one or more non-transitory tangible media of claim 15, wherein the localized sync recovery is based on passive detection in one or more of the shifted listening intervals without transmission of any beacon request.

20. The one or more non-transitory tangible media of claim 15, further operable for causing sync recovery for child network devices, having attached to the constrained network device, based on stepwise transition from the prescribed listening interval to the shifted listening interval for data packets transmitted to the child network devices.

* * * * *